(12) United States Patent
Spears et al.

US007349129B2

(10) Patent No.: US 7,349,129 B2
(45) Date of Patent: Mar. 25, 2008

(54) CONTROLLER FOR PHOTOSENSOR ARRAY WITH MULTIPLE DIFFERENT SENSOR AREAS

(75) Inventors: Kurt E. Spears, Fort Collins, CO (US); Edward S Beeman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1380 days.

(21) Appl. No.: 09/780,984

(22) Filed: Feb. 9, 2001

(65) Prior Publication Data

US 2002/0051228 A1 May 2, 2002

Related U.S. Application Data

(63) Continuation-in-part of application No. 09/430,471, filed on Oct. 29, 1999.

(51) Int. Cl.
*G06K 7/00* (2006.01)
*G06K 9/00* (2006.01)
(52) U.S. Cl. .................. 358/445; 382/312; 382/148
(58) Field of Classification Search ............. 358/445, 358/448, 482, 483, 1.2, 514, 512, 517, 1.1, 358/1.9, 1.11–1.18, 471, 494; 382/312; 348/262, 348/265, 207.99, 223.1; 250/208.2, 203.6
See application file for complete search history.

(56) References Cited

U.S. PATENT DOCUMENTS

| | | | | |
|---|---|---|---|---|
| 4,204,230 A | | 5/1980 | Sprague | |
| 4,288,821 A | | 9/1981 | Lavallee et al. | |
| 4,438,457 A | | 3/1984 | Tandon et al. | |
| 4,479,143 A | | 10/1984 | Watanabe et al. | |
| 4,543,489 A | | 9/1985 | Harada et al. | 250/578 |
| 4,554,585 A | | 11/1985 | Carlson | 358/209 |
| 4,559,452 A | * | 12/1985 | Igaki et al. | 250/559.36 |
| 4,634,883 A | * | 1/1987 | Nishiura et al. | 358/482 |
| 4,634,886 A | * | 1/1987 | Hatanaka et al. | 358/482 |
| 4,805,006 A | | 2/1989 | Yamaguchi et al. | 357/30 |
| 4,870,483 A | * | 9/1989 | Nishigaki et al. | 358/512 |
| 4,939,573 A | | 7/1990 | Teranishi et al. | |
| 4,985,760 A | * | 1/1991 | Maeshima et al. | 358/514 |
| 4,994,907 A | | 2/1991 | Allen | |
| 5,020,118 A | | 5/1991 | Sugiura | 382/50 |
| 5,045,932 A | | 9/1991 | Sharman et al. | |
| 5,055,921 A | * | 10/1991 | Usui | 358/512 |
| 5,075,770 A | | 12/1991 | Smyth | 358/80 |
| 5,151,588 A | | 9/1992 | Kiri et al. | 250/208.1 |

(Continued)

*Primary Examiner*—Gabriel Garcia
*Assistant Examiner*—Thierry L. Pham

(57) ABSTRACT

A controller controls selection of rows of photosensors residing in a photosensor array having at least one row of photosensors with a first sensor size, and at least one row of photosensors with a second sensor size. In a first example embodiment, the controller may select each sensor in a double row of sensors for white light having a smaller area than the sensors in other rows. For the first embodiment, the native input sampling rate for luminance is greater than the native input sampling rate for color information. In a second example embodiment, for every band of wavelengths being sensed, the controller selects one of two rows of sensors, with one row having relatively small sensor areas and the other row having relatively large sensor areas. In the second example embodiment, the rows with relatively small sensor areas are used for high native input sampling rates, and the rows with relatively large sensor areas are used for high color accuracy.

18 Claims, 5 Drawing Sheets

U.S. PATENT DOCUMENTS

| | | | |
|---|---|---|---|
| 5,262,871 A | 11/1993 | Wilder et al. | 358/213.11 |
| 5,267,335 A | 11/1993 | Mita | 382/62 |
| 5,285,293 A * | 2/1994 | Webb et al. | 358/471 |
| 5,345,319 A | 9/1994 | Yu | |
| 5,447,345 A | 9/1995 | Daley | |
| 5,489,940 A | 2/1996 | Richardson et al. | 348/315 |
| 5,751,032 A | 5/1998 | Yu | |
| 5,773,814 A * | 6/1998 | Phillips et al. | 250/208.1 |
| 5,796,095 A | 8/1998 | Matsuyama et al. | 250/208.1 |
| 5,874,993 A * | 2/1999 | Ciccarelli et al. | 348/294 |
| 5,896,173 A | 4/1999 | Hassler | 348/162 |
| 5,898,509 A * | 4/1999 | Bianchi et al. | 358/483 |
| 5,926,218 A | 7/1999 | Smith | 348/358 |
| 5,949,061 A | 9/1999 | Guidash et al. | 250/208.1 |
| 5,949,483 A | 9/1999 | Fossum et al. | 348/303 |
| 5,969,830 A | 10/1999 | Kimura | |
| 5,973,311 A | 10/1999 | Sauer et al. | 250/208.1 |
| 6,009,214 A * | 12/1999 | Suggs | 382/312 |
| 6,034,366 A | 3/2000 | Yu | |
| 6,040,202 A | 3/2000 | Yu | |
| 6,137,100 A | 10/2000 | Fossum et al. | 250/208.1 |
| 6,166,831 A | 12/2000 | Boyd et al. | 358/483 |
| 6,320,618 B1 | 11/2001 | Aoyama | 348/335 |
| 6,765,691 B2 * | 7/2004 | Kubo et al. | 358/1.9 |

* cited by examiner

US 7,349,129 B2

CONTROLLER FOR PHOTOSENSOR ARRAY WITH MULTIPLE DIFFERENT SENSOR AREAS

CLAIM OF PRIORITY

This application is a continuation-in-part of copending U.S. utility application entitled, "PHOTOSENSOR ARRAY WITH MULTIPLE DIFFERENT SENSOR AREAS," having Ser. No. 09/430,471, filed on Oct. 29, 1999, which is incorporated herein by reference in its entirety.

FIELD OF THE INVENTION

This invention relates generally to photosensor arrays used for optical image scanners and cameras and, more specifically, to line arrays commonly used for optical image scanners.

BACKGROUND OF THE INVENTION

Image scanners convert a visible image on a document or photograph, or an image in a transparent medium, into an electronic form suitable for copying, storing or processing by a computer. An image scanner may be a separate device or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example, a photographic positive slide through an optics system, and then onto an array of photosensitive devices.

Photosensor arrays commonly have three or four rows of sensors, with each row receiving a different band of wavelengths of light, for example, red, green and blue. Each row may be filtered, or white light may be separated into different bands of wavelengths by a beam splitter. Typically, the pitch (spacing of individual photosensor elements) is the same for each row, and typically the pitch is set to provide a specified native input sampling rate.

In general, there is an ongoing demand for increased resolution and speed, improved color quality and image quality, and reduced cost demands that often directly conflict and require trade-offs. The following background presents some of the factors affecting resolution, speed, color quality, image quality and cost.

In general, image scanners use an optical lens system to focus an image onto an array of photosensors. Photosensor arrays typically have thousands of individual photosensitive elements. Each photosensitive element, in conjunction with the scanner optics system, measures light intensity from an effective area on the document defining a picture element (pixel) on the image being scanned. Optical sampling rate is often expressed as pixels per inch (or mm) as measured on the document (or object, or transparency) being scanned. Optical sampling rate as measured on the document being scanned is also called the input sampling rate. The native input sampling rate is determined by the optics and the pitch of the individual sensors. A scanner operator may select a sampling rate that is less than the native input sampling rate by simply dropping selected pixels, or by using digital re-sampling techniques. Alternatively, a scanner operator may select a sampling rate that is greater than the native input sampling rate where intermediate values are computed by interpolation. Typically, all the charges or voltages are read from the photosensor array, and are then digitized, and then sub-sampling or interpolation is performed on the resulting digital pixel data.

Bit depth is the number of bits captured per pixel. Typically, a pixel is specified in a three-dimensional color space with a fixed number of bits in each dimension. For example, a pixel may be specified in red, green, blue (RGB) color space, with 8 bits of red information, 8 bits of green information, and 8 bits of blue information, for a total of 24 bits per pixel. Alternatively, a pixel may be specified in a cylindrical color space in which the dimensions are luminance, chrominance, and saturation. Alternatively, a three-dimensional CIE color space may be used, for example, CIELAB or CIELUV, where one dimension is luminance. In this application, "high" bit depth means that all bits are accurate, distinguishing accuracy from simple resolution. That is, a scanner could provide many bits of information, but have a noise level that makes most of the lower order bits meaningless.

Even if a sensor is receiving no light, some thermal noise (called dark noise) may occur. Thermal noise (dark noise) is proportional to time. During exposure to light, the primary noise source (called shot noise) is related to conversion of photons to electrons, and the noise increases with the square root of the signal. Small sensors tend to have a lower signal-to-noise ratio than large sensors, particularly for low reflectance or low transmissivity areas of a document. Smaller sensor areas can provide higher input sampling rates, but other measures of image quality, and, in particular, color quality, as measured by signal-to-noise may be reduced.

If an input sampling rate is selected that is lower than the native input sampling rate, then the signal-to-noise may be improved by combining samples. Analog signals from adjacent sensor areas may be added, or digital values may be averaged after analog-to-digital conversation. Adding N samples improves the signal-to-noise ratio by the square root of N. Typically, adding analog signals requires the signal levels to be relatively small before adding to avoid saturating a charge element, so that analog averaging is typically used for speed (fewer conversions) but not for improvement in signal-to-noise ratio.

Scanning speed is affected by multiple factors; shift time of registers multiplied by number of pixels being shifted, and output amplifier speed. Typically, for low native input sampling rates, the primary limiter is exposure time, that is, the time required to illuminate the photo elements sufficiently to provide an acceptable signal-to-noise ratio. However, if the number of pixels being shifted becomes very large, then the time required to shift the individual pixel signals to an amplifier may become the limiting factor.

Areas of an image with slowly varying color, particularly dark colors, require high bit depth and high signal-to-noise to accurately reproduce the smooth tone and texture of the original. For areas of slowly varying color, high input sampling rate is not needed because there is no high frequency information in the image. Areas of an image that change color rapidly, for example, a forest scene or a close-up photograph of a multi-colored fabric, need a high input sampling rate to compute the high frequency information but high bit depth and high signal-to-noise are not needed. That is, for high frequency information, the color accuracy of each individual pixel is less important. High input sampling rates require small sensor areas, which in turn have relatively low signal-to-noise ratios, relatively low bit depth, and relatively low scanning speed. Large sensor areas provide high signal-to-noise, high bit depth, and high speed, but cannot provide high input sampling rates.

There is a need for a scanner that provides both high color quality and high native input sampling rate.

SUMMARY OF THE INVENTION

A control system controls a photosensor array having at least one row of photosensors with a first sensor size, and at least one row of photosensors with a second sensor size, with the two sizes being different. In a first example embodiment, the controller selects between the row of first photosensors and the row of second photosensors. In another embodiment, the second row is a double row of photosensors, each sensor in the double row of photosensors detects white light having a smaller area than the photosensors in other rows. For the first embodiment, the native input sampling rate for luminance is greater than the native input sampling rate for chrominance and saturation. In a second example embodiment, for every band of wavelengths being sensed, a controller selects one of two rows of photosensors, with photosensors in one row having relatively small sensor areas and the other row having relatively large sensor areas. In the second example embodiment, the rows with relatively small sensor areas are used for high native input sampling rates, and the rows with relatively large sensor areas are used for high color accuracy and speed.

DETAILED DESCRIPTION OF THE PREFERRED EMBODIMENT OF THE INVENTION

Figure 3:
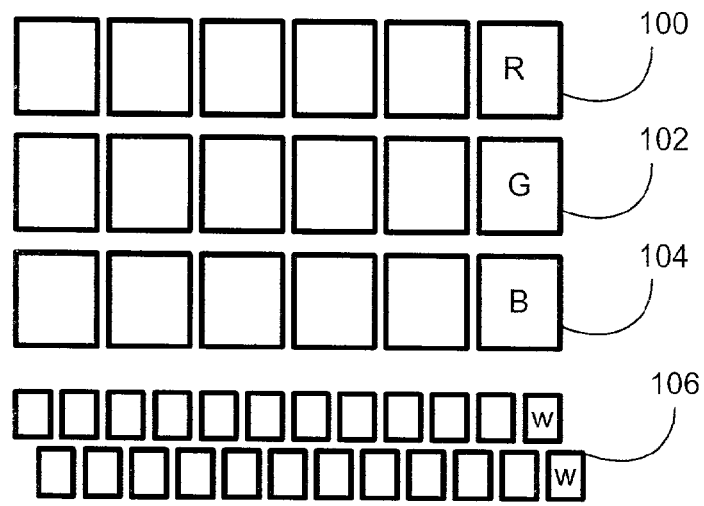
FIG. 3 is a block diagram plan view of a multi-row photosensor array in accordance with a first example embodiment of the invention.

FIG. 3 illustrates a photosensor array with three rows having relatively large sensor areas (100, 102, and 104) plus one double row having relatively small sensor areas (106). The area of each sensor element in rows 100-104 is illustrated as being approximately four times the area of each sensor element in double row 106 (which will be discussed in more detail later below). Sensor areas 106 may optionally be in a staggered double row as illustrated, may optionally be overlapping as illustrated, or may optionally be non-overlapping. However, for purposes of the present invention, the important feature of sensor areas 106 is size, and not whether they are arranged in a double row, or overlapping, or non-overlapping. For convenience of discussion, small CCD's requiring a focusing lens will be used to illustrate certain points. For convenience of illustration, each single row (100-104) in FIG. 3 illustrates 6 sensors, and the double row (106) illustrates 24 sensors, whereas in an actual photosensor array used in scanning each row might have several thousand sensors residing on a single substrate. In one embodiment, all rows reside on a single substrate.

For convenience of discussion, assume, for example, that row 100 receives red light, row 102 receives green light, row 104 receives blue light, and double row 106 receives visible white light (double row 106 may have a filter that suppresses infrared light). The actual order of color is not important and the ordering illustrated is only an example to facilitate discussion. Note that the exposure time may be different for each sensor size to enable each sensor to generate sufficient electrons to provide a specified signal level at a specified maximum illumination intensity on the document being scanned, even though filter transmissivity or beam splitting efficiency may vary from color to color.

Figure 1:
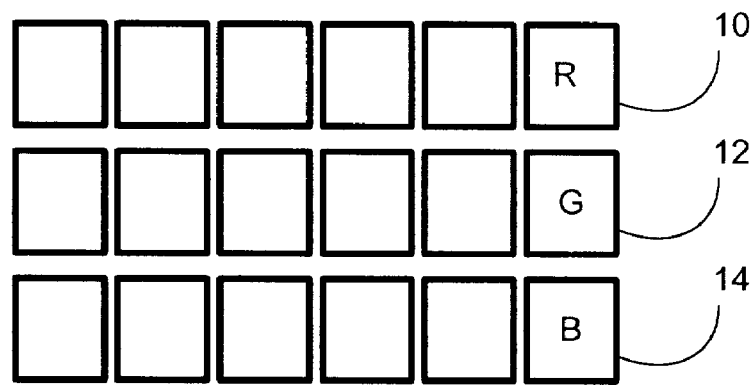
FIG. 1 is a block diagram plan view of a prior art multi-row photosensor.
Figure 2:
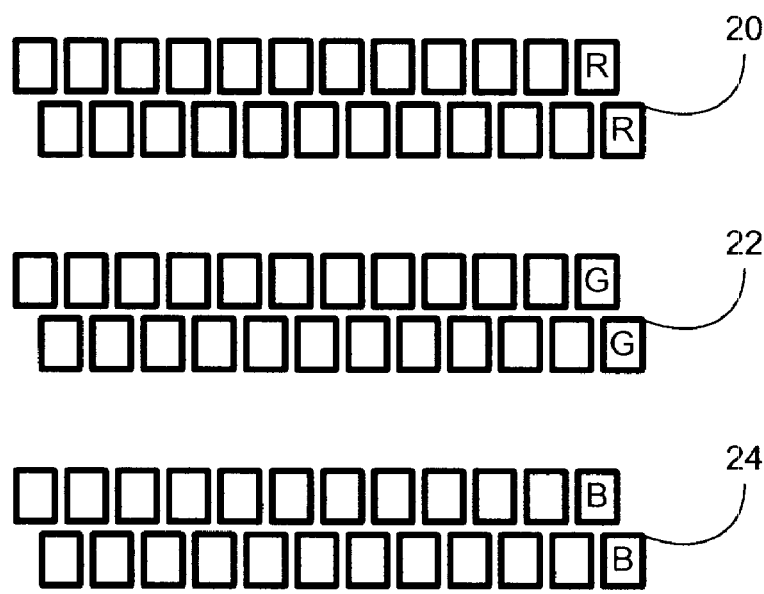
FIG. 2 is a block diagram plan view of a prior art multi-row photosensor array having a higher pixel density than the prior art multi-row photosensor of FIG. 1.

Consider, for example, typical prior art sensor arrays as illustrated in FIGS. 1 and 2. For the first example shown in FIG. 1, consider an array having three lines having the sensor areas of rows 10, 12 and 14. For the second example shown in FIG. 2, consider an array having three double rows 20, 22 and 24 having the sensor areas similar to a single row 10, 12, and/or 14 of FIG. 1. The first example array of FIG. 1 provides good signal-to-noise but at a relatively low native input sampling rate. The second example array of FIG. 2 provides a high native input sampling rate, but with reduced signal-to-noise. However, prior art controller techniques for a scanner configured having the rows of FIG. 1 combined with FIG. 2 would have a large number of amplifiers and controller components to control the flow of image data from the sensor rows, depending upon which sensor rows are selected based upon the particular scanning requirements of the image being scanned. When the system and method of the present invention is employed in a scanner configured according to FIG. 1, in a manner explained hereinafter, fewer amplifiers and fewer controller components may be required, thereby providing the benefit of fewer component costs and lower overall unit costs, particularly when the components are implemented on the same die.

Of course, for the second example of FIG. 2, one could average the data from sets of four sensor areas to generate approximately the native input-sampling rate of the first example. However, note that a sensor area having four times the area will have at least two times better signal-to-noise, whereas averaging four samples, because of smaller signals, A/D conversion, and other factors, will improve the signal-to-noise by less than a factor of two. In addition, averaging digitized signals adds complexity and requires time. In addition, four of the sensors in a double row 20, 22 and/or 24 have less active areas than one sensor in a single row (10, 12 and/or 14) because of the fixed size of non-sensitive areas. As illustrated in FIG. 1, the spacing between sensor areas for double rows 20, 22 and 24 are illustrated as having approximately the same spacing between sensor areas as for rows 10, 12 and 14. For the illustrative example of FIG. 1, if the horizontal space between sensor areas in rows 10, 12 and 14 is one unit, the sensor areas in rows 10, 12 and 14 are drawn as approximately 7 units wide by 8 units high, and the sensor areas in double rows 20, 22 and 24 are drawn as approximately 3 units wide by 4 units high. As a result, the sum of four areas from double rows 20, 22 and 24, given the sizes chosen for FIG. 1, can be approximated by the ration 48/56, or about 86%, of the areas of the exemplary one-sensor areas from rows 10, 12 and 14. Thus, for the two illustrative examples, even for the same input sampling rates, the first example would provide better signal-to-noise than the second example.

The sensor array of FIG. 3, in accordance with the present invention, provides the advantages of both examples of the prior art shown in FIGS. 1 and 2; providing a high input sampling rate at a relatively low signal-to-noise ratio for luminance, which carries most of the high frequency information, and a high signal-to-noise at a lower sampling rate for color, where bit depth is important. If row 106 receives visible white light, as assumed above for illustration, then the array of FIG. 3 provides luminance information at four times the native input sampling rate of red, or green, or blue. However, the red, green, and blue channels provide better signal-to-noise, permitting more accurate bit depth to enable resolution of small incremental steps of intensity. The red, green, and blue data may, for example, be transformed into a CIELAB or CIELUV color space, and then the luminance data from the double row may be used for the luminance dimension instead of the luminance data from the red, green, and blue sensors. Row 106 is shown as a double row of sensors for convenience of illustration, however, any plurality of rows of sensors could be employed in row 106.

Figure 4:
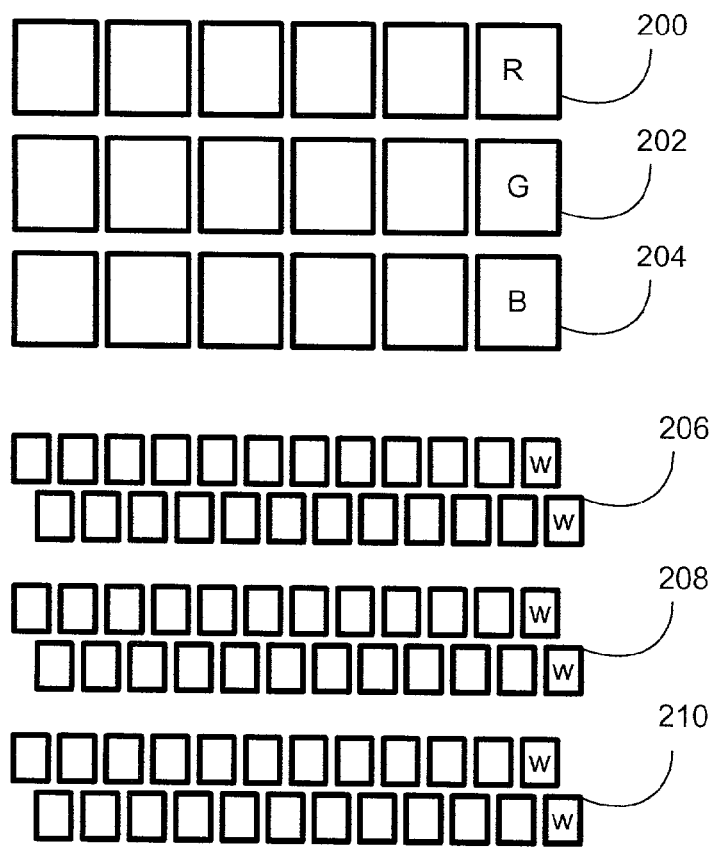
FIG. 4 is a block diagram plan view of a multi-row photosensor array in accordance with a second example embodiment of the invention.

FIG. 4 illustrates an alternative example embodiment of the invention. In FIG. 4, a sensor array has one row of relatively large sensors for each of three colors 200, 202 and 204, and one double row of relatively small sensors for each of three colors 206, 208 and 210 may be used. If the scanner operator chooses a low input-sampling rate, the single rows 200, 202 and 204 may be used. Rows 206, 208 and 210 are shown as a double row of sensors for convenience of illustration, however, any plurality of rows of sensors could be employed in rows 206, 208 and 210.

All rows in FIG. 4 may receive a limited bandwidth of wavelengths, for example, red, green and blue as illustrated. Again, the order of the colors is just an example. Alternatively, one single row and one double row may receive white light and one color may be computed. For example, if the rows receive red, blue and white, green may be computed as: green=white−red+blue. If one single row and one double row are white, then combinations of sizes may be used for one scan as discussed for FIG. 3. In addition, if one single row and one double row are white, then black and white scans (for example, text or line art) may be performed using only a white channel, which in general is faster. That is, comparing a high resolution white channel (FIG. 3, 106) to the same resolution color channel (FIG. 4, 206), the white channel receives unfiltered higher intensity light, and is therefore faster (see, for example, U.S. Pat. No. 5,773,814). Finally, large sensors require less exposure time than small sensors so that the row of large sensors may be used alone for faster scans.

The embodiment of FIG. 4 provides high resolution for all colors, or high signal-to-noise for all colors, depending on the needs of the scanner operator. The embodiment of FIG. 4 may require more amplifiers (at least 6 amplifiers for FIG. 4 and at least 4 amplifiers for FIG. 3) if implemented using prior art control schemes. However, signals may be multiplexed so that, for example, in FIG. 4, row 200 may share an amplifier with row 206, row 202 may share an amplifier with row 208, and row 214 may share an amplifier with row 210, requiring only three amplifiers and three multiplexers.

For some applications, the embodiment of FIG. 3 may provide suitable input sampling rate and signal-to-noise at a slightly lower cost than the embodiment of FIG. 4. If the embodiment of FIG. 3 has a high-resolution white channel as illustrated, and if the embodiment of FIG. 4 has all color channels as illustrated, then the embodiment of FIG. 3 also has the advantage of faster black and white scans, as discussed above. Either embodiment provides either higher input sampling rate, or higher signal-to-noise, relative to a sensor array that only has sensor areas of one size.

Figure 5:
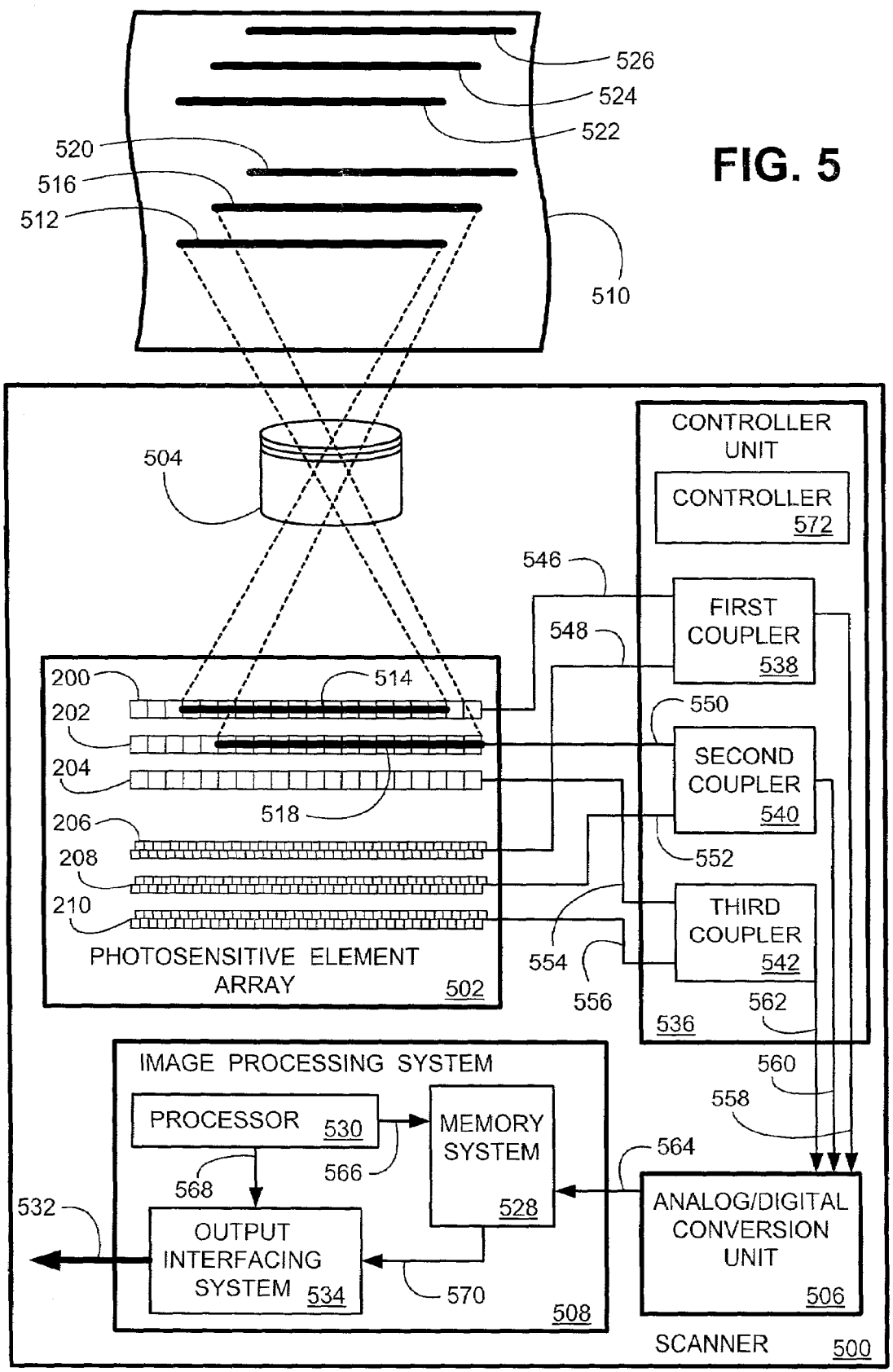
FIG. 5 is a block diagram plan view of a multi-row photosensor array of FIG. 2 employed in an exemplary scanner having a controller in accordance with the present invention scanning a portion of an image.

The system and method of the present invention is explained now in detail with respect to an exemplary scanner 500 in which a photosensitive element array 502 configured in accordance with the array illustrated in FIG. 4 above. For convenience of illustration, elements in FIG. 5 that are similar to those in FIG. 4 bear the same reference numerals. Such elements having the same reference numerals in FIGS. 4 and 5 may be considered to be like elements. However, one skilled in the art will realize that elements in FIGS. 4 and 5 need not be identical, as any variations of such elements will not adversely affect the functioning and performance of the present invention. Therefore, like elements are like-numbered and will not be described again in detail. As is well known in the art, scanner 500 typically contains an optical subsystem 504, an analog/digital conversion unit 506 and an image processing system 508. For convenience of illustration, scanner 500 is illustrated with a limited number of components which are relevant to an explanation of the system and method of the present invention. Thus, only those components relevant to the functioning of the present invention are shown in FIG. 5 and described herein. Scanner 500 will likely contain additional components which are not illustrated in FIG. 5. Furthermore, the components illustrated in FIG. 5, such as optical subsystem 504 and image processing system 508, will have many subcomponents and parts not illustrated in FIG. 5. The exemplary scanner 500 illustrated in FIG. 5 is only representative of one of many types of scanning devices which are used to scan an image, particularly with respect to the optical subsystem and the process of scanning a document with scan lines. The system and apparatus of the present invention is intended to operate in any image scanning device, such devices having the same or similar components to scanner 500 of FIG. 5, or having the same components of scanner 500 connected or configured in a different manner. Any such alternative embodiments of a scanner which employs the present invention is intended to be within the scope of this disclosure and to be protected by the accompanying claims for the present invention.

FIG. 5 illustrates an example process of scanning document 510. At any given scanning cycle, the sensor rows of photosensitive element array 502 detect a different scan line on document 510. For example, scan line 512 is detected by sensor row 200 through optical subsystem 504, as shown by the detected scan line 514. Similarly, scan line 516 is detected by sensor row 202 through optical system 504 as shown by the detected scan line 518. Sensor rows 204, 206, 208 and 210 similarly detect scan lines 520, 522, 524 and 526, respectively. For convenience of illustration, the images detected by sensor rows 204, 206, 208 and 210 are not illustrated. The optical subsystem 504 and the scanning process described above are intended to illustrate one possible scanning system which utilizes the apparatus and method of the present invention, as described hereinafter. Other scanners may employ alternative types of optical subsystems and/or other types of scanning processes. Any such scanners which employ the apparatus and method of the present invention are intended to be within the scope of this disclosure and to be protected by the accompanying claims for the present invention.

During the next scanning cycle, the document 510 is advanced such that each of the sensor rows detects the adjacent scan lines. Scanning cycles continue such that the entire document 510 is passed over optical subsystem 504. Image data detected by sensor rows 200, 202, 204, 206, 208 and 210 are processed in accordance with the system and method of the present invention, described hereinafter, and stored in memory system 528 for processing by processor 530. After processing, using well known techniques, the scanned image is output from scanner 500, via connection 532. Typically, image processing system 508 would have an output interfacing system 534 which properly formats data corresponding to the scanned image for output to an external device (not shown). Examples of external devices may include, but are not limited to, electronic copy machines, facsimile machines, personal computers (PCs) and/or display monitors.

In accordance with the system and method of the present invention, controller unit 536 controls the output of the sensor rows 200, 202, 204, 206, 208 and/or 210 such that the desired image data is received by image processing system 508. Controller unit 536 has a first coupler 538, a second coupler 540 and a third coupler 542. First coupler 538 is coupled to sensor row 200 and sensor row 206, via connections 546 and 548, respectively, as described above. Second coupler 540 is coupled to sensor row 202 and sensor row 208 via connections 550 and 552, respectively. Third coupler 542 is coupled to sensor row 204 and sensor row 210 via connections 554 and 556, respectively. The output of first coupler 538 is coupled to the analog/digital conversion unit 506 via connection 558. Similarly, the output of second coupler 540 is coupled to the analog/digital conversion unit 506 via connection 560, and the output of the third coupler 542 is coupled to the analog/digital conversion unit 506 via connection 562.

The output of analog/digital conversion unit 506 is coupled to memory system 528 via connection 564. For convenience of illustration, connection 564 is shown as a single line. However, connection 564 may be three connections, or another suitable number of connections, such that the image data is delivered to memory system 528. Furthermore, memory system 528 is typically made of a large number of memory arrays, also known as frame buffers, which are not shown for convenience of illustration. A detailed explanation of the architecture and operation of an image processing system 508 and memory system 528, and the associated controlling of data within memory system 528 by processor 530, is not described in detail herein because such an explanation is not required for an understanding of the operation and functionality of the present invention. For convenience of illustration, processor 530 is shown to control memory system 528 and output interface system 534 employing systems and techniques well known in the art of managing data in memory systems and in providing output to an external device (not shown).

A controller 572 resides in controller 536. Controller 572 provides the appropriate control signals to the first coupler 538, second coupler 540 and third coupler 542 such that the desired image data is provided to the image processing system 508. The operation and functionality of controller 572 is explained in detail hereinbelow and illustrated in FIG. 6.

Figure 6:
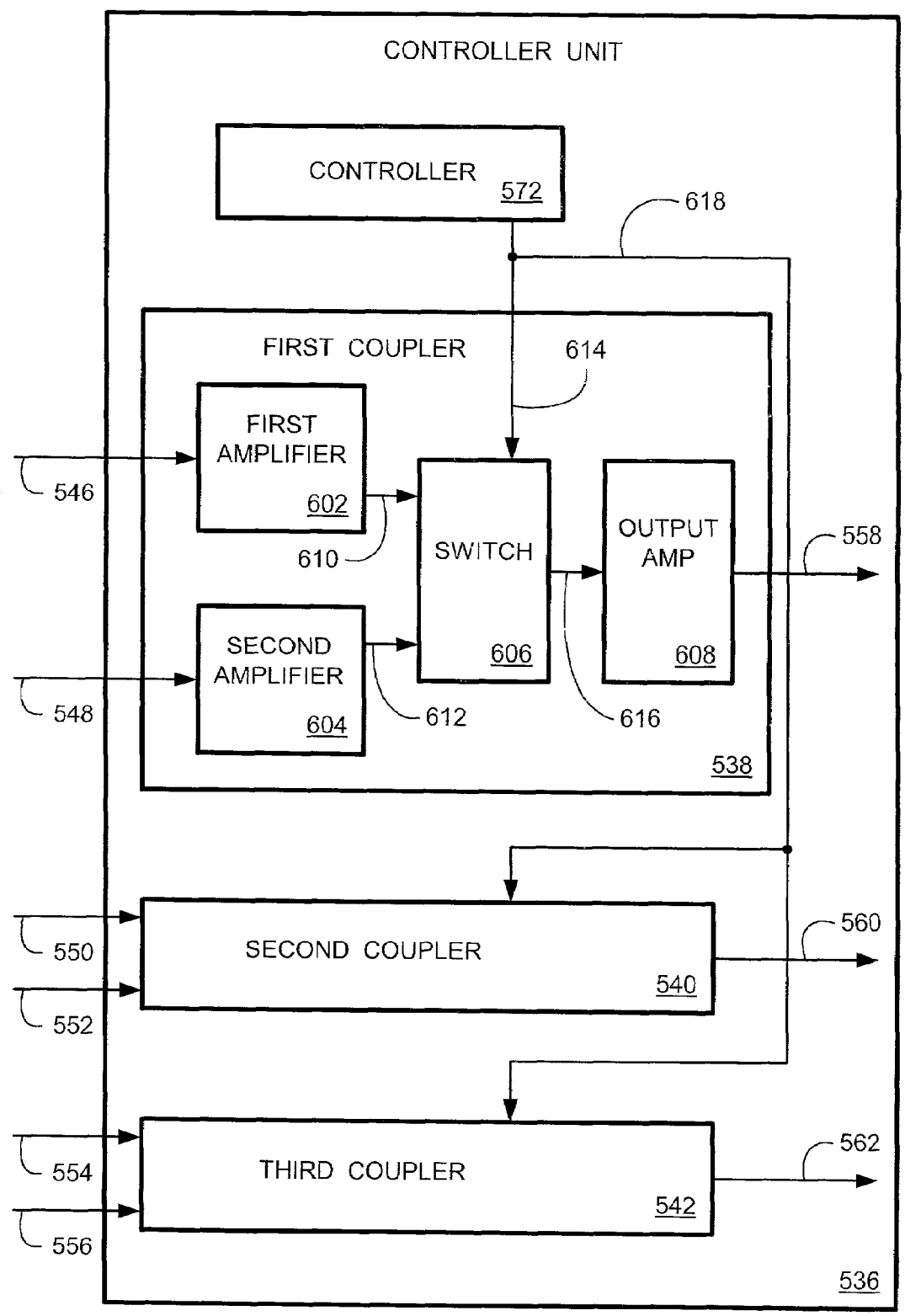
FIG. 6 is a block diagram plan view of the controller of FIG. 4 in accordance with a first example embodiment of the invention.

FIG. 6 illustrates components residing in controller unit 536. For convenience of illustration, elements in FIG. 6 that are similar to those in FIG. 5 bear the same reference numerals. Such elements having the same reference numerals in FIGS. 5 and 6 may be considered to be like elements. Therefore, like elements are like-numbered and will not be described again in detail. Furthermore, the components residing in second coupler 540 and third coupler 542 are similar to the components residing in the first coupler 538. For convenience of illustration, the components residing in the second coupler 540 and the third coupler 542 are not illustrated in FIG. 6. However, it is understood that the components residing in the second coupler 540 and third coupler 542 will be similar in architecture and operate in a similar manner as described for the components residing in first coupler 538. First coupler 538 has a first amplifier 602, a second amplifier 604, a switch 606 and an output amplifier (amp) 608.

First amplifier 602 is coupled to sensor row 200 (FIG. 5) via connection 546. Similarly, second amplifier 604 is coupled to sensor row 206 (FIG. 5) via connection 548. The output of first amplifier 602 is coupled to switch 606 via connection 610 and the second amplifier 604 is coupled to switch 606 via connection 612. Controller 572 controls switch 606, via connection 614, such that the output of either the first amplifier 602 or the second amplifier 604 is provided to output amp 608 via connection 616. The output of output amp 608 is coupled to the analog/digital conversion unit 506 (FIG. 5) via connection 558.

When switch 606 is configured to pass the output of first amplifier 602, image data sensed by sensor row 200 is output to the image processing system 508 (FIG. 5). Alternatively, switch 606 may be configured to pass the output of the second amplifier 604, and thus the image data sensed by sensor row 206 (FIG. 5) is output to the image processing system 508. Thus, the first coupler 538 allows image data sensed by either sensor 200 or sensor row 206 to be selectively output to the image processing system 508.

Similarly, controller 572 would control the second coupler 540, via connection 618, such that either the image data sent by sensor row 202 or the image data sent by sensor row 208 is output to the image processing system 508 (FIG. 5). Similarly, the third coupler 542 will pass image data from sensor row 204 or image data sensed by sensor row 210 to the image processing system 508 as determined by controller 572, which is coupled to the third coupler 542 via connection 618. For convenience of illustration, connection 618 is shown to be substantially the same connection as connection 614. However, alternative embodiments may employ separate connection lines without departing substantially from the operation and functionality of the present invention.

In a typical mode of operation for the system and method of the present invention, controller 572 would control the switches residing in the first coupler 538, second coupler 540, and third coupler 542 such that image data from sensor rows 200, 202 and 204 are passed to the image processing system 508, or such that the image data sensed by sensor rows 206, 208 and 210 are passed to the image processing system 508 (FIG. 5). Thus, the low resolution sensor rows 200, 202 and 204 may be selected for scanning the image on document 510 (FIG. 5) when lower resolution scanning is appropriate. Conversely, when higher resolution scanning of the image on document 510 is required, controller unit 536 would control the switches residing in the first coupler 538, second coupler 540, and third coupler 542 such that image data sensed by sensor rows 206, 208 and 210 are passed to the image processing system 508.

As noted above, first amplifier 602 is receiving image data sensed by sensor row 200. Sensor row 200 is made of low resolution image sensors which provide an output charge which is collected and passed through a controller unit 536 via connection 546. For convenience of illustration, the process and method by which charges on the photosensitive elements residing in sensor row 200 are converted into electrical signals is not described herein as such a detailed explanation of such processes is not necessary to an understanding of the operation and functionality of the present invention. Such methods and systems for collecting charges from the photosensitive elements are well known in the art.

However, one aspect of the process of converting charges in a sensor row into an electrical signal is pertinent to the operation and functionality of the present invention, and is explained by way of an illustrative example. In this example, one system may employ a transfer gate to transfer the charge off of the photosensitive element into a shift register which collects the charges. The shift register feeds the charges into an amplifier such that an electrical signal corresponding to the image data is generated. Such an amplifier which collects charges from a shift register is intended to be equivalent to the first amplifier 602 residing in the first coupler 538. The first amplifier 602 would amplify charges from the shift register such that a meaningful electrical signal having the appropriate amplitude is generated, typically such a signal is an analog signal. Similarly, charges from photosensitive elements residing in sensor row 206 would be collected and amplified by second amplifier 604. The designing, sizing and specification of first amplifier 602 and second amplifier 604 (and the amplifiers residing in second coupler 540 and third coupler 542) are well known in the art and are not described in detail herein. After a suitable electrical signal has been generated by the first amplifier 602, assuming switch 606 is configured to pass the output of first amplifier 602, the electrical signal generated by the first amplifier 602 is output to output amp 608 via connection 610 and 616. Output amp 608 further amplifies the electrical signal to a desired value and outputs the amplified signal to the analog/digital conversion unit 506 (FIG. 5).

Alternative embodiments of controller unit 536 may not require output amp 608. In such an alternative embodiment, the output of the first amplifier 602 and the second amplifier 604 would be designed to provide the desired output electrical signal of an appropriate amplitude to the analog/digital conversion unit 506. It is intended that such an alternative embodiment be included herein within the scope of this disclosure and to be protected by the accompanying claims for the present invention.

First amplifier 602, second amplifier 604 and output amp 608 are shown to reside within the first coupler 538, which resides in controller unit 536, for convenience of illustration and explanation of the operation and functionality of the present invention. One skilled in the art will appreciate that first amplifier 602, second amplifier 604 and/or output amp 608 may be conveniently selected from a plurality of standardized parts, or may be specially fabricated amplifiers or similar electrical devices which perform substantially the same functionality. In particular, one embodiment would have the amplifiers and/or the couplers included on the same substrate as the sensor arrays. Such components and configurations may be used in controller unit 536 so long as the above-described switching functionality of the present invention is provided. Furthermore, first amplifier 602, second amplifier 604 and/or output amp 608 may reside in other alternative convenient locations. All such modifications and variations are intended to be included herein within the scope of this disclosure and to be protected by the accompanying claims for the present invention.

The photosensor arrays illustrated in FIGS. 3-8 may comprise for example, CCD's, CMOS sensors, photodiodes, solar cells, or other sensors suitable for converting light intensity into an electrical signal. The photosensor arrays illustrated in FIGS. 3-8 may alternatively comprise Contact Imaging Sensors (CIS), which may also use CCD's or CMOS or other technologies. Note that CIS modules typically do not use filters or beam splitters, but instead, use a single sensor row and sequentially illuminate the row with different colored light sources, such as Red, Green, and blue Light Emitting Diodes (LED's). Therefore, for CIS modules, the configuration could comprise a single row having relatively large sensor areas, and a single row having relatively small sensor areas, with no color filtering on either row. Both rows may be used simultaneously, using the small sensors for a high-input-sampling-rate, high-noise luminance channel and the larger sensors for low-input-sampling rate, low-noise color. One row may be used. That is, the row with relatively small sensor areas may be used for high native input sampling rates, or the row with relatively large sensor areas may be used for high color accuracy. Alternatively, the row with large sensors may be used alone for faster scanning.

Figure 7:
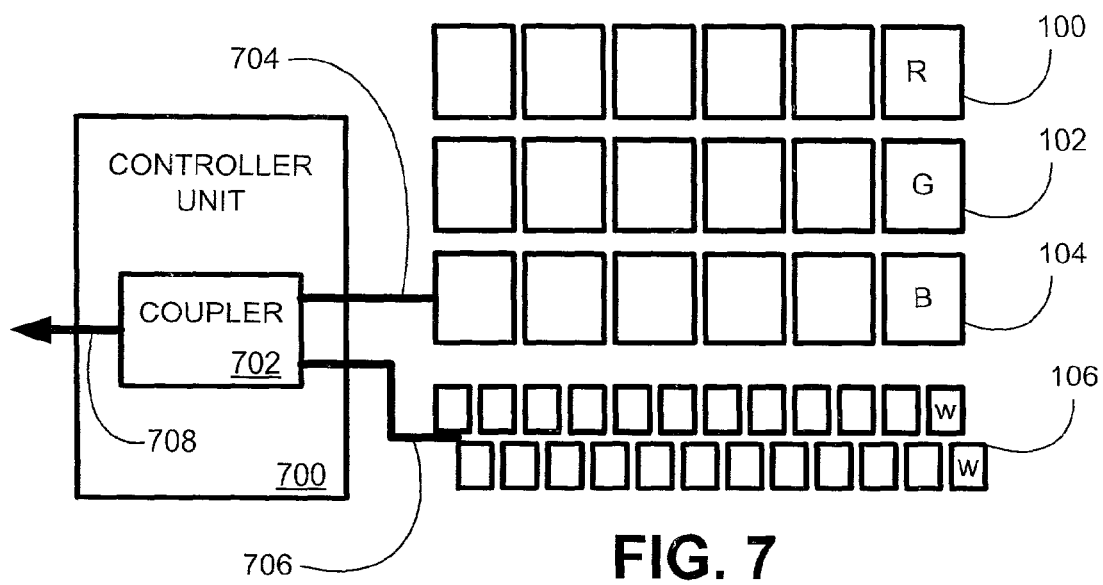
FIG. 7 is a block diagram plan view of an alternative embodiment configured to operate with the sensor rows of FIG. 3.

FIG. 7 illustrates an alternative embodiment of a scanner having a plurality of sensor rows configured according to FIG. 3. With this alternative embodiment, controller unit 700 controls coupler 702. Coupler 702 is coupled to sensor row 104, via connection 704, and is coupled to sensor row 106, via connection 706. Here, coupler 702 enables the system and method of the present invention to select either sensor row 104 or sensor row 106, depending upon the particular scanning requirements of the image to be scanned. For example, if a color image is to be detected, coupler 702 would allow the image data sensed by sensor row 104 to pass through coupler 702 and out to the analog/digital conversion unit (not shown) via connection 708. Alternatively, if the image to be scanned consisted of black and white textual information, scanning with sensor row 106 may be preferred. Here, controller unit 700 would operate a switch (not shown) residing in coupler 702 such that image data sensed by sensor row 106 is sent to the analog/digital conversion unit (not shown) via connection 708. Furthermore, connection 704 is shown to be coupled to sensor row 104 in FIG. 7. Connection 704 could have been alternatively coupled to sensor row 102 or sensor row 100 in this alternative embodiment.

Figure 8:
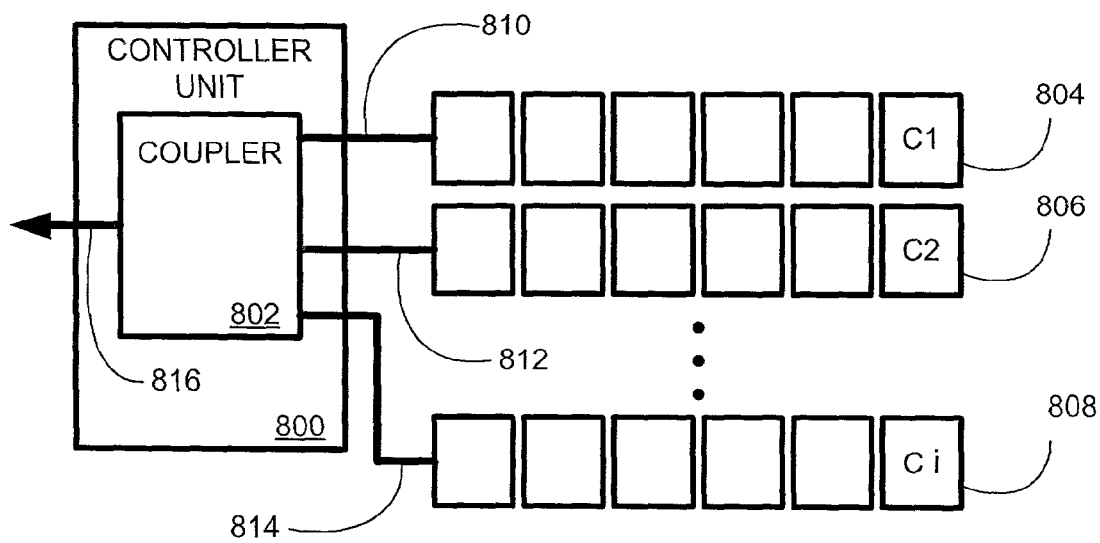
FIG. 8 is a block diagram plan view of an alternative embodiment which may select one sensor row from a plurality of sensor rows.

FIG. 8 illustrates yet another alternative embodiment of a scanner employing the system and method of the present invention. Controller unit 800 provides control to a switch (not shown) residing in coupler 802. Coupler 802 is connected to a plurality of sensor rows (804, 806 and 808) via connections 810, 812 and 814, respectively. Here, the sensor elements C1 residing in sensor row 804 are configured to detect a preselected color at a preselected resolution, a preselected bit depth, and/or a preselected sampling rate. Similarly, sensor element C2 residing in sensor row 806 is configured to sense a preselected color, typically the same color as sensed by sensor element C1, but at a different resolution, a different bit depth and/or a different sampling rate than sensor element C2. Likewise, sensor element $C_i$ residing in sensor row 808 is configured to detect the same color as sensor elements C1 and C2, but at another resolution, bit depth and/or sampling rate. For convenience of illustration, the individual photosensor elements (C1, C2 and $C_i$) in sensor rows 804, 806 and 808 are drawn having the same dimensions. Typically, photosensor elements C1, C2 and $C_i$ would have different active areas (and therefore different dimensions). Depending upon the particular scanning requirements of the image to be scanned, the scanner may provide control information to controller unit 800 such that the desired sensor row (804, 806 or 808) is selected. One skilled in the art will understand that with this alternative embodiment, a corresponding set of plurality of sensor rows, each plurality of sensor rows coupled into a coupler configured similarly to coupler 802, would be used to detect colors other than the color sensed by sensor element C1, C2 and/or $C_i$. Thus, the alternative embodiment illustrated in FIG. 8 provides for a system and method which allows the scanner to select from among a plurality of available sensor rows and Lo pass the desired image data to the analog/digital conversion unit (not shown) via connection 804.

An exemplary embodiment of the scanner illustrated in FIG. 8 would employ three sensor rows. The sensor rows would have resolutions of 300, 60 and 2400 sensor areas per sensor row. The 2400 sensor area resolution may be configured from two 1200 sensor area rows in parallel. The controller provide control signals to a switch residing in the coupler to select the desired sensor row. Three sets of three sensor rows could be employed to sense red, green and blue colors.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable other skilled in the art to best utilize the invention in various embodiments and various modifications as are suited to the particular use contemplated. It is intended that the appended claims be construed to include other alternative embodiments of the invention except insofar as limited by the prior art.

What is claimed:

1. A multiple resolution sensing apparatus comprising:
a plurality of first photosensor elements coupled together to form a first linear array and having a first length and a first resolution;
a plurality of second photosensor elements coupled together to form a second linear array and having a second length and a second resolution;
a coupler having a switch, an output, and an output amplifier, said coupler coupled to said first linear array and to said second linear array; and
a controller coupled to said coupler and providing a control signal to said switch such that said output is coupled to said first linear array when said first resolution is employed and such that said output is coupled to said second linear array, instead of said first linear array, when said second resolution is employed;
the output amplifier being operative to amplify signals provided by the first linear array only when the first resolution is being employed and to amplify signals provided by the second linear array only when the second resolution is being employed.

2. The apparatus of claim 1, wherein said first linear array and said second linear array are located on a single substrate.

3. The apparatus of claim 1, wherein said first linear array, said second linear array and said coupler are located on a single substrate.

4. The apparatus of claim 1, wherein said coupler further includes a first and a second amplifier, and wherein said first linear array, said second linear array and said coupler are located on a single substrate.

5. The apparatus of claim 1, wherein said first length and said second length are substantially the same and at least equal to one dimension of an image to be sensed.

6. The apparatus of claim 4, wherein said first amplifier is coupled between said switch and said first linear array such that charges detected by said plurality of first photosensor elements are amplified into a first electrical signal; and
said second amplifier is coupled between said switch and said second linear array such that charges detected by said plurality of second photosensor elements are amplified into a second electrical signal.

7. The apparatus of claim 1, wherein said first linear array and said second linear array detect only a first color of light.

8. The apparatus of claim 1, further comprising:
a plurality of third photosensor elements coupled together to form a third linear array and having a third length and said first resolution;
a plurality of fourth photosensor elements coupled together to form a fourth linear array and having a fourth length and said second resolution;
a second coupler having a second output, said second coupler coupled to said third linear array and to said fourth linear array;
a plurality of fifth photosensor elements coupled together to form a fifth linear array and having a fifth length and said first resolution;
a plurality of sixth photosensor elements coupled together to form a sixth linear array and having a sixth length and said second resolution;
a third coupler having a third output, said coupler coupled to said first linear array and to said second linear array,
wherein said controller is coupled to said second coupler and said third coupler, and wherein said controller provides said control signal to said second coupler so that said second output is coupled to said third linear array when said first resolution is employed and so that said second output is coupled to said fourth linear array when said second resolution is employed, and wherein said controller provides said control signal to said third coupler so that said third output is coupled to said fifth linear array when said first resolution is employed and so that said third output is coupled to said sixth linear array when said second resolution is employed.

9. The apparatus of claim 8, wherein said first linear array and said second linear array detect a first color of light, wherein said third linear array and said fourth linear array detect a second color of light, and wherein said fifth linear array and said sixth linear array detect a third color of light.

10. The apparatus of claim 8, wherein said first linear array, said second linear array, said third linear array, said fourth linear array, said fifth linear array and said sixth linear array are located on a single substrate.

11. The apparatus as in claim 10, wherein said first length, said second length, said third length, said fourth length, said fifth length and said sixth length are substantially the same and at least equal to one dimension of an image to be sensed.

12. The apparatus as in claim 1, further comprising a plurality of third photosensor elements coupled together to form a third linear array and having a third length and a third resolution, said third linear array coupled to said coupler and wherein said controller providing a control signal to said coupler such that said output is coupled to said third linear array when said third resolution is employed.

13. The apparatus of claim 11, wherein said first linear array, said second linear array, said third linear array and said coupler are located on a single substrate.

14. The apparatus of claim 11, wherein said first length, said second length and said third length are substantially the same and at least equal to one dimension of an image to be sensed.

15. The apparatus of claim 14, wherein said coupler further comprises a third amplifier coupled to said third linear array such that charges detected by said plurality of third photosensor elements are amplified into a third electrical signal.

16. The apparatus of claim 15, wherein said first linear array, said second linear array and said third linear array detect a first color of light.

17. The apparatus of claim 12, wherein said first resolution corresponds to said first linear array having substantially 300 of said first photosensitive elements, wherein said second resolution corresponds to said second linear array having substantially 600 of said second photosensitive elements, and wherein said third resolution corresponds to said third linear array having substantially 2400 of said third photosensitive elements.

18. The apparatus of claim 17, wherein said third linear array is comprised of two rows, each row having substantially 1200 of said third photosensitive elements.

* * * * *

UNITED STATES PATENT AND TRADEMARK OFFICE
CERTIFICATE OF CORRECTION

PATENT NO. : 7,349,129 B2  Page 1 of 1
APPLICATION NO. : 09/780984
DATED : March 25, 2008
INVENTOR(S) : Kurt E. Spears et al.

It is certified that error appears in the above-identified patent and that said Letters Patent is hereby corrected as shown below:

In column 11, line 15, delete "Lo" and insert -- to --, therefor.

Signed and Sealed this

Twenty-eighth Day of April, 2009

JOHN DOLL
*Acting Director of the United States Patent and Trademark Office*